US010882543B2

(12) United States Patent
Schmidt et al.

(10) Patent No.: US 10,882,543 B2
(45) Date of Patent: Jan. 5, 2021

(54) PROFILE DETECTION METHOD

(71) Applicant: Mi-Jack Products, Inc., Hazel Crest, IL (US)

(72) Inventors: Harvey E. Schmidt, Flossmoor, IL (US); Daniel B. Zakula, Sr., Mokena, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 0 days.

(21) Appl. No.: 16/100,883

(22) Filed: Aug. 10, 2018

(65) Prior Publication Data

US 2018/0346004 A1    Dec. 6, 2018

Related U.S. Application Data

(62) Division of application No. 15/068,077, filed on Mar. 11, 2016, now Pat. No. 10,077,061.

(60) Provisional application No. 62/132,278, filed on Mar. 12, 2015.

(51) Int. Cl.

| | |
|---|---|
| *B61L 25/04* | (2006.01) |
| *G01B 11/14* | (2006.01) |
| *B61L 25/02* | (2006.01) |
| *G06Q 10/08* | (2012.01) |
| *H04W 4/021* | (2018.01) |
| *G06F 16/29* | (2019.01) |
| *B61L 27/00* | (2006.01) |
| *G01V 8/12* | (2006.01) |

(52) U.S. Cl.
CPC .......... *B61L 25/048* (2013.01); *B61L 25/025* (2013.01); *B61L 27/0077* (2013.01); *G01B 11/14* (2013.01); *G01V 8/12* (2013.01); *G06F 16/29* (2019.01); *G06Q 10/087* (2013.01); *H04W 4/021* (2013.01)

(58) Field of Classification Search
CPC combination set(s) only.
See application file for complete search history.

(56) References Cited

U.S. PATENT DOCUMENTS

| | | | |
|---|---|---|---|
| 4,932,784 A | 6/1990 | Danneskiold-Samsoe | |
| 4,936,529 A | 6/1990 | Maine | |
| 5,138,560 A * | 8/1992 | Lanfer | G01D 5/2495 235/454 |
| 5,142,658 A * | 8/1992 | McMorran | B65G 63/004 180/167 |
| 5,493,517 A | 2/1996 | Frazier | |

(Continued)

OTHER PUBLICATIONS

Robert Owens, Mi-Jack Products, TraPac Intermodal Railyard Automation and Grunt Vehicle Proposal, Mar. 15, 2013 (21 pages).

*Primary Examiner* — Kyle O Logan

(74) *Attorney, Agent, or Firm* — McCracken & Gillen LLC

(57) ABSTRACT

A profile detection method is provided. A Global Positioning System unit and a laser sensor are provided to be disposed adjacent an article wherein the Global Positioning System unit, the laser sensor, and the article are relatively movable. Outputs of the Global Positioning System unit and the laser sensor are sensed. The steps of sensing an article identification tag and developing an indication of article location based on sensing the article identification tag are performed. An indication device develops an indication of a profile of the article responsive to the sensed outputs of the Global Positioning System unit and the laser sensor.

7 Claims, 5 Drawing Sheets

(56) References Cited

U.S. PATENT DOCUMENTS

| | | | |
|---|---|---|---|
| 5,505,585 A * | 4/1996 | Hubbard | B65G 63/004 414/139.4 |
| 5,780,826 A * | 7/1998 | Hareyama | B66C 19/007 180/167 |
| 6,554,189 B1 * | 4/2003 | Good | G02B 26/106 235/462.01 |
| 7,916,026 B2 | 3/2011 | Johnson et al. | |
| 8,630,443 B2 | 1/2014 | Tan et al. | |
| 2001/0022332 A1 * | 9/2001 | Harland | B61L 25/023 246/122 R |
| 2003/0038179 A1 * | 2/2003 | Tsikos | G06K 7/10 235/454 |
| 2006/0111929 A1 * | 5/2006 | Poole | G06Q 10/087 705/1.1 |
| 2008/0111693 A1 * | 5/2008 | Johnson | G01S 13/74 340/572.1 |
| 2008/0219827 A1 * | 9/2008 | Lanigan | B61B 1/005 414/792.8 |
| 2011/0010005 A1 * | 1/2011 | Tan | B66C 13/46 700/214 |
| 2011/0017693 A1 * | 1/2011 | Thomas | B66C 13/16 212/270 |
| 2011/0027059 A1 * | 2/2011 | Benedict | B66C 13/08 414/803 |
| 2012/0199648 A1 * | 8/2012 | Hanson | G01C 21/20 235/375 |
| 2016/0264160 A1 * | 9/2016 | Tougas | B61L 27/0094 |
| 2017/0151971 A1 * | 6/2017 | Shubs, Jr. | B61L 27/0094 |

* cited by examiner

PROFILE DETECTION METHOD

CROSS REFERENCE TO RELATED APPLICATIONS

The present application is a divisional of Schmidt, et al., U.S. application Ser. No. 15/068,077, filed Mar. 11, 2016, entitled "Profile Detection System and Method", which claims the benefit of U.S. Provisional Application Ser. No. 62/132,278, filed Mar. 12, 2015, entitled "Profile Detection System and Method". The entire contents of this application are incorporated herein by reference.

REFERENCE REGARDING FEDERALLY SPONSORED RESEARCH OR DEVELOPMENT

Not applicable

SEQUENTIAL LISTING

Not applicable

FIELD OF THE DISCLOSURE

The present inventive subject matter relates to detection systems and methods, and more particularly, to systems and methods for detecting one or more train or other article profiles.

BACKGROUND

Railroad terminals comprising rail yards receive a description, referred to as a "manifest consist", for trains arriving at the yard. The description includes the number of cars, location of the cars, and the cargo identification for each car. The rail yards want to verify and confirm that the content of the train is as it was described. It is important for rail yard accuracy, productivity, efficiency, and thru-put that the exact position of each rail car and load is known. The train can consist of over 100 cars of various lengths. The cars can have single containers, double stacked containers, twin twenty foot containers, or a combination thereof. The rail yards typically read rail car IDs to confirm the cars' arrival in the yard. Differences in car position can result from whether the train is pushed or pulled into the yard. Further, the relaxation or tightness of the rail car couplers combined with the number of cars and car lengths can mean that car position, and therefore the loads, may be off by many feet from a theoretical position.

Modern terminals use a terminal operating system (TOS) that exercises supervisory control over terminal operations in accordance with operator commands and terminal protocols. Use of a TOS permits a terminal to keep track of inventory and schedule tasks. The TOS, working in conjunction with a PDS (Position Detection System), can automate many tasks that at one time were undertaken manually, such as loading or unloading of a car, assembly or disassembly of cars to or from a train, or the like. A TOS can only accomplish these functions with knowledge of the precise location and identification of the car and contents thereof.

In order to enable the rail yard to identify the location of rail cars effectively, the rail yard can be equipped with a GPS positioning system that includes a GPS base station and GPS receiver(s) on the cranes used to load and unload railcars, and the GPS data may be referenced to a map of the yard that is geo-referenced and converted to local coordinates for ease of use. The local coordinate system is established to match and integrate with the TOS requirements. The locomotive positioning the rail cars is equipped with a GPS antenna and rover to provide approximate location information as well as providing locations for safety protection. While GPS is one system that provides the accuracies required for location, this system alone cannot support all of the capabilities that would be desirable in profiling the cars of the train.

SUMMARY

A profile detection method is provided. A Global Positioning System unit and a laser sensor are provided to be disposed adjacent an article wherein the Global Positioning System unit, the laser sensor, and the article are relatively movable. Outputs of the Global Positioning System unit and the laser sensor are sensed. The steps of sensing an article identification tag and developing an indication of article location based on sensing the article identification tag are performed. An indication device develops an indication of a profile of the article responsive to the sensed outputs of the Global Positioning System unit and the laser sensor.

Other aspects and advantages of the present disclosure will become apparent upon consideration of the following detailed description and the attached drawings wherein like numerals designate like structures throughout the specification.

DETAILED DESCRIPTION

Disclosed herein are a system and a method of developing an indication of a profile of an article, such as a train and its contents, and correlating profile information with position as developed by a position sensing device or devices. In one example embodiment, the position sensing device(s) comprise Global Positioning System (GPS) units as noted in greater detail hereinafter, and/or other technologies to provide accurate position of the article, such as rail cars and loads in a rail yard having single or multiple sets of tracks.

Figure 1:
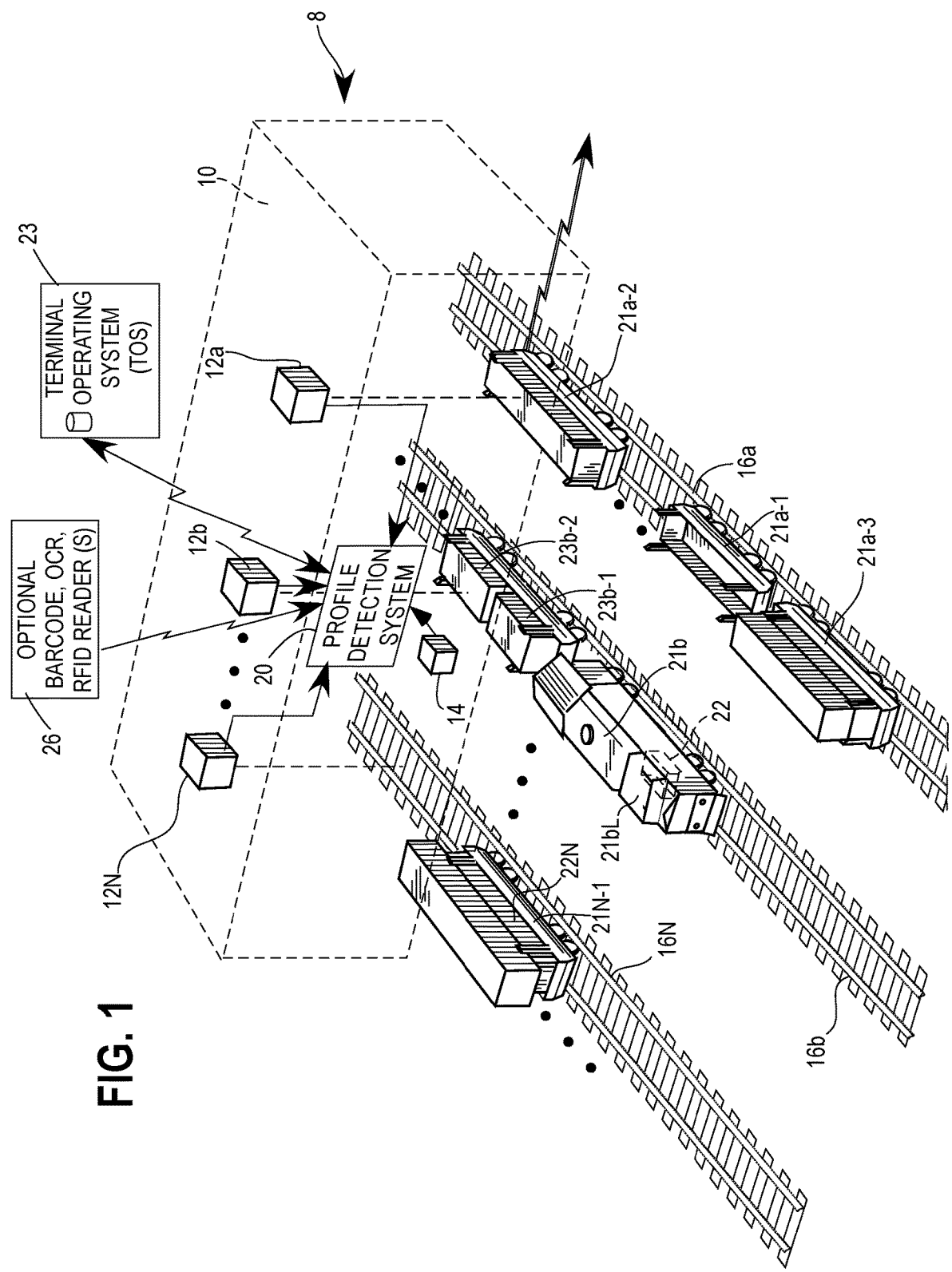
FIG. 1 is a simplified isometric and block diagram of an embodiment of a profile detection system according to a particular embodiment.

Referring to FIG. 1, a system 8 is installed at least in part on a support structure, for example, a rubber-tired gantry crane (RTG), a rail-mounted gantry crane (RMG) 10, or equivalent equipment (which may be moving or stationary), and includes one or more laser sensor distance sensors 12a, 12b, . . . , 12N as well as a Global Positioning System (GPS) unit 14 carried by the support structure 10. The laser sensor(s) 12 are mounted at the top of or at any other portion of the crane over each of one or more rail track(s) 16a, 16b, . . . , 16N pointed down at the rail track. Each laser sensor 12 preferably has a range of up to 70 meters and is preferably accurate to within 3 millimeters. Further, each laser sensor 12 preferably has a frequency response sufficient to allow sampling periods to be short enough to allow, in turn, reliable detection of car profiles. Preferably each laser sensor 12 comprises a model MDHD100 laser distance sensor sold by MODULOC Control Systems, Inc. of Monroeville, Pa. The frequency response of each sensor 12 may be 50 hertz or higher (e.g., up to 1000 hertz), although a lower frequency response may be adequate to permit reliable profile detection. Preferably, each laser sensor 12 has an output communication protocol (e.g., RS232, RS422, RS485, etc.) capable of communicating with a mobile and/or desktop computer, tablet, smartphone, or equivalent programmable device that has sufficient memory and operating capabilities at least to store and/or communicate to a further device the position data developed by the sensor(s) 12. The position data may be processed by any suitable analog, digital or other device (which may be the same device that stored/communicated the position data or a different device, e.g., the further device) to implement a profile detection and indication system 20 that develops an indication in the form of train profile data whereby a desired accuracy, responsiveness, and communication are obtained. The train profile data may be transmitted to any other system operated by the rail yard operator.

As noted in greater detail hereinafter, the RTG, RMG, or equivalent machine 10 is driven from one end of the track to the other, which can be up to full equipment speed, (e.g., approximately 5 MPH or greater) and the laser sensors 12 measure the distances to the reflective surfaces of one or more train(s) 21a, 21b, . . . , 21N (only portions of which are shown in the FIGS.). Alternatively, one or more trains 21 can move relative to the machine 10, which may be stationary, or the machine and train(s) 21 may both move. In any event, during relative movement of the machine 10 and the train(s) 21, the system 8 measures the vertical distances to surfaces of one or more train(s) 21. Each train may be operated by a train locomotive operator having access to an optional portable GPS unit 22. The vertical distance readings are communicated to the system 20 and correlated with position data provided by the crane GPS unit 14. The laser sensor readings comprise vertical distances referenced to the laser sensor fixed vertical position and the laser sensor frequency response, and, when combined with the output of the crane GPS unit 14, enables sub-inch horizontal or travel direction reading responsiveness even at full equipment speed. The readings come from reflections off of container tops, rail car couplers, rail car wells, etc. and are processed to filter out erroneous readings caused by overly reflective surfaces, such as tape or special paint, rust, snow, etc. and ensure the data provided to the computer is in an appropriate format. The filtered and conditioned readings are stored in a database and compared against known dimensions and spacing of containers, rail cars, couplers, etc. to obtain an indication of train profile, and therefore, train composition. The indication may be developed by the profile detection and indication system 20, and/or by any other system, such as a network server. This indication can be compared with manifest consist information to obtain rail car identification.

Figure 2:
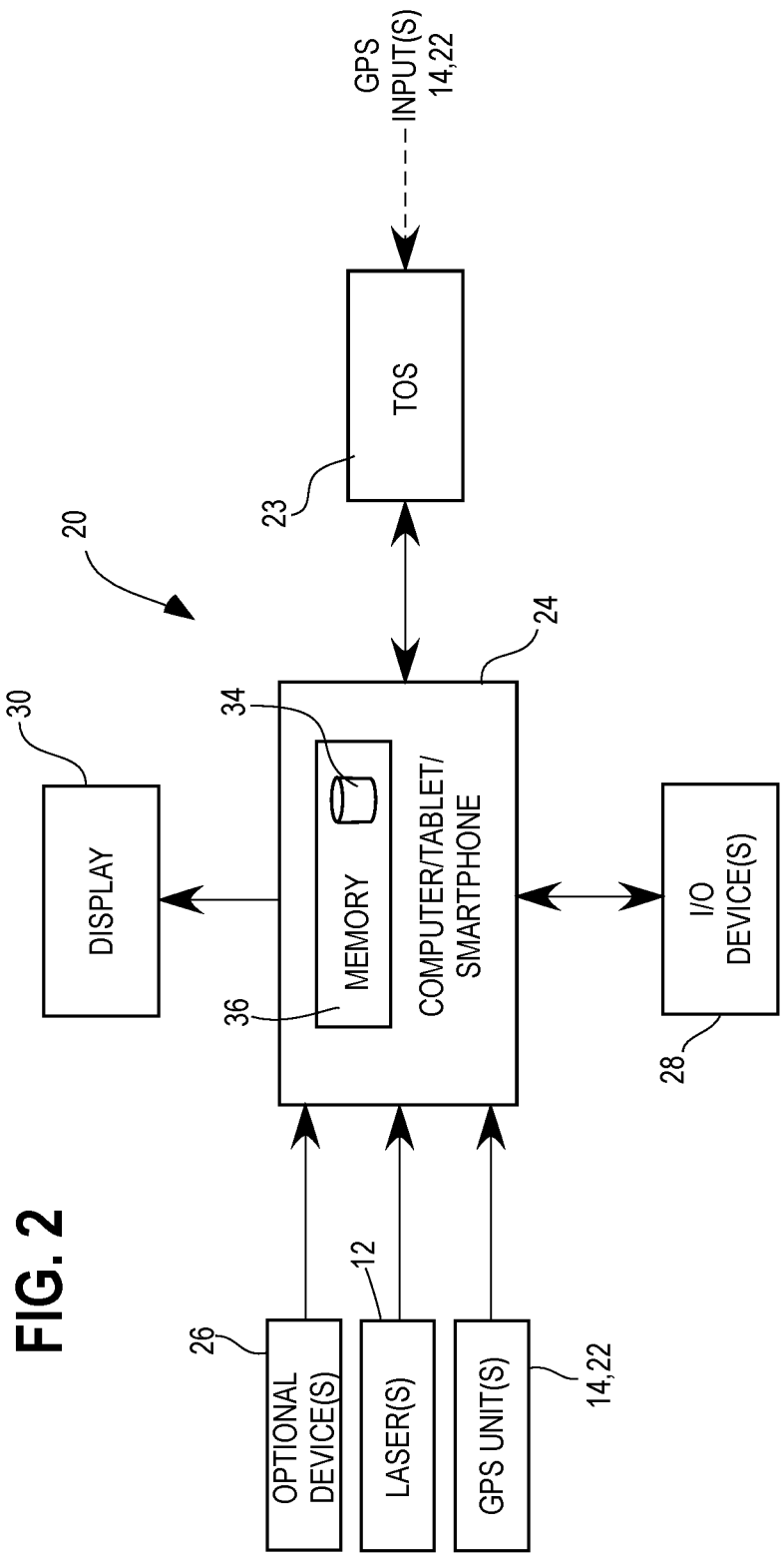
FIG. 2 is a block diagram of a computer-implemented profile detection system.
Figure 3:
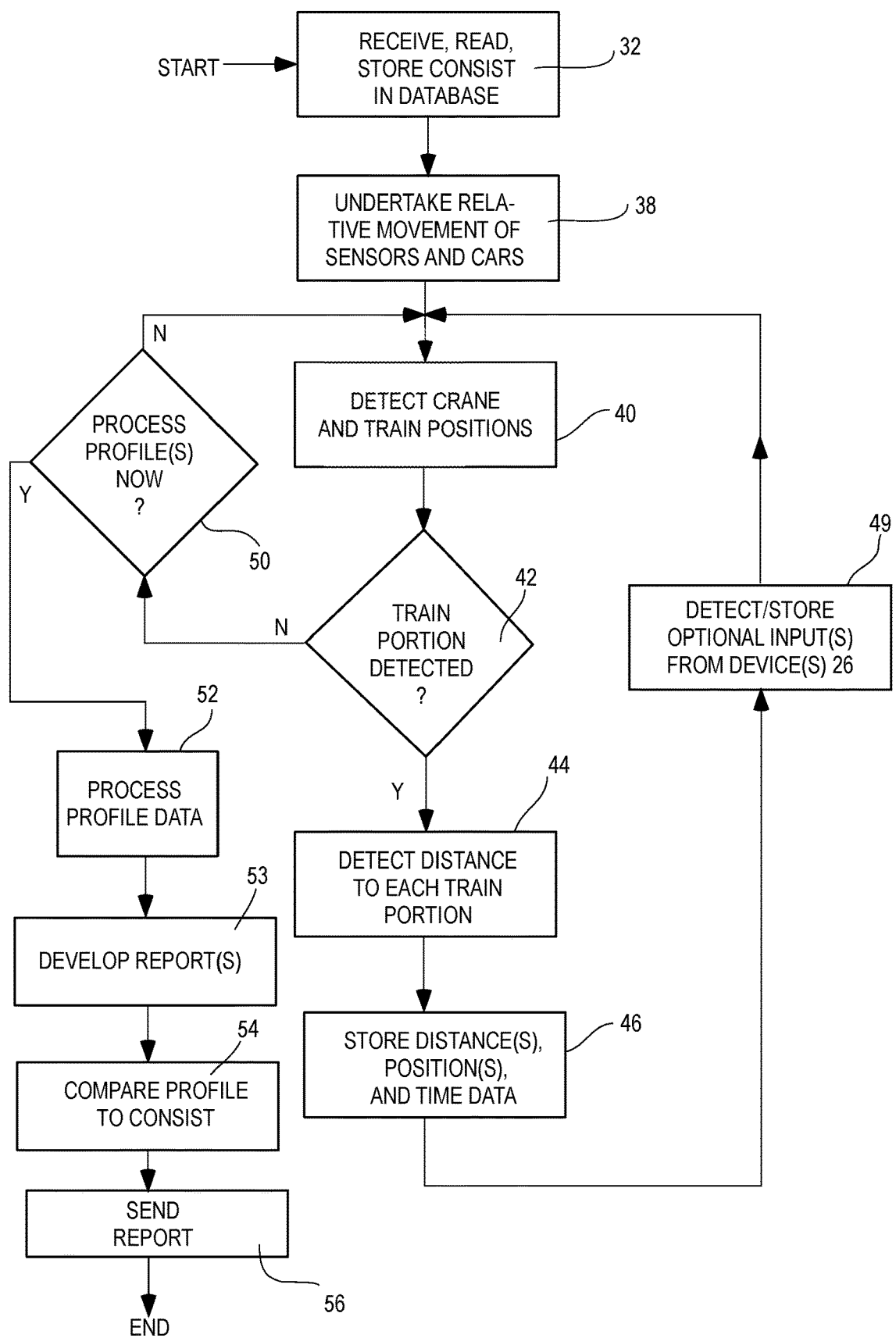
FIG. 3 is a flowchart illustrating a first embodiment of programming undertaken by the profile detection system of FIG. 2.
Figure 3A:
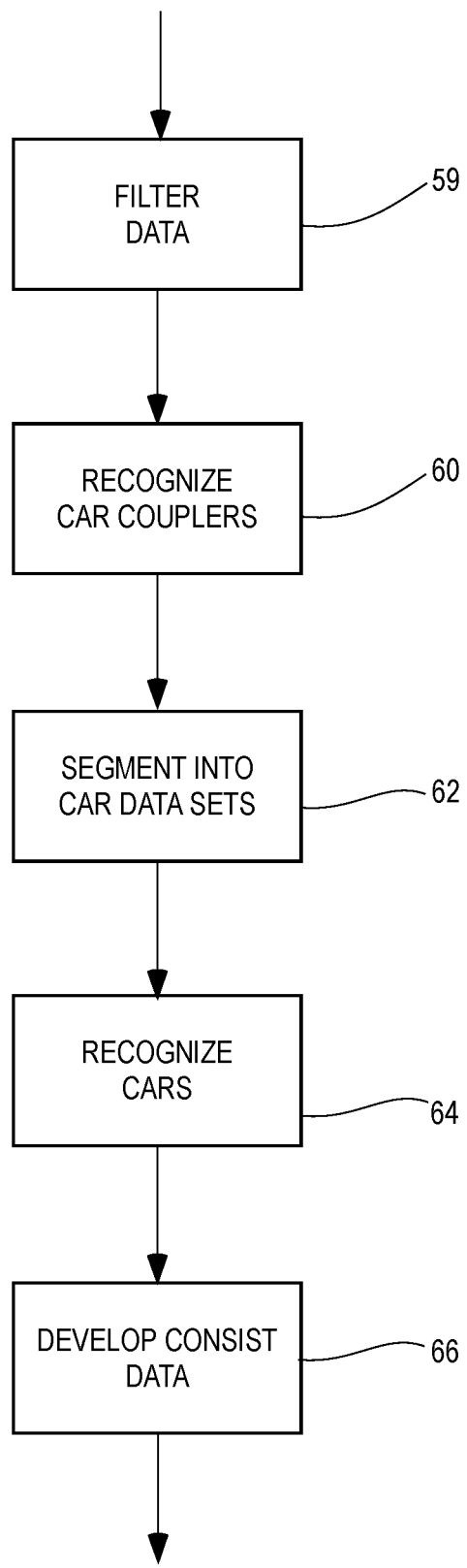
FIG. 3A is a flowchart illustrating the programming of the block 52 of FIG. 3 in greater detail.
Figure 4:
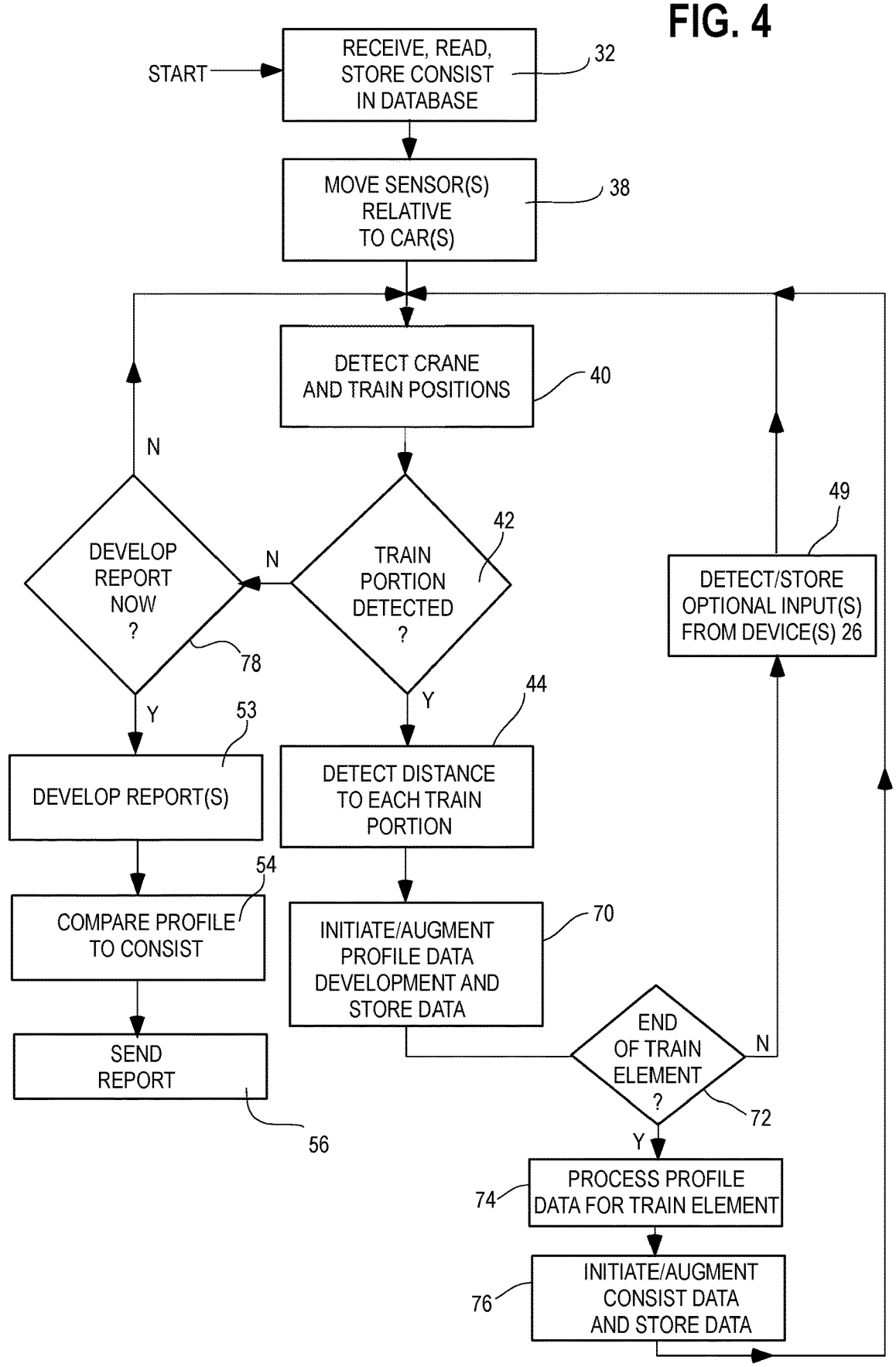
FIG. 4 is a flowchart illustrating a second embodiment of programming undertaken by the profile detection system of FIG. 2.

FIGS. 3, 3A, and 4 illustrate alternative programming that can be executed by one or more programmable devices to implement the system 20. Some or all of the programming illustrated in FIGS. 3 and 4 may be executed by a programmable device such as a laptop computer, a desktop computer, a network server, a tablet, a smartphone, etc. Alternatively, the system 20 may be implemented by any suitable analog or digital device(s), or any other device(s) having the required capabilities, with or without the ability to execute programming, as should be evident to one of ordinary skill in the art. FIG. 2 illustrates an example of a computer system that executes programming to implement the system 20. A programmable device 24 is responsive to input signals or data, such as signals or data developed by the crane GPS unit 14, the signals or data developed by the laser sensors 12, and optional additional input signals or data developed by one or more devices 26, for example, a barcode reader, an optical character recognition (OCR) reader, a radio frequency identification (RFID) reader, encoders, and/or the like. These latter devices read indicia and/or other marks, surfaces, and the like on the cars, containers, other train portions, etc. The programmable device 24 can include an integral display 28 and input/output (I/O) device(s) 30 (e.g., keyboard, mouse, etc.) or is hardwired to or otherwise communicates (e.g., wirelessly) with such devices if not integral therewith. The programmable device 24 may further communicate with one or more external devices and/or systems, such as over a hard-wired or wireless connection.

FIG. 3 illustrates a first embodiment of programming that may be executed by the device 24 to develop an indication of train profile. The programming is executed multiple times during relative movement of the crane 10 and train(s) 21 to develop a profile of a single train or multiple trains. The programming begins at a block 32 that receives, reads, and stores train manifest consist data in a database 34 (FIG. 2) maintained in a memory 36 of the device 24 (and/or, possibly, in other local or remote database(s)). While the block 32 is shown as being operative before other programming, this need not be case, inasmuch as this block need only be operative before a block 53 discussed hereinafter. Relative movement of the crane 10 and train(s) 21 is thereafter undertaken (block 38). As noted above, the train(s) 21 may be stationary and the crane 10 may be moved over the train(s) 21, or vice versa, or both the train (s) 21 and the crane 10 may be moved. A block 40 then detects the current positions of the crane 10 and any train(s) 21 located on the tracks 16. This is accomplished by sensing the outputs of the GPS units 14, which are used to develop indications of all locations for the profiling system. The block 40 may also detect the outputs of any then-available train portable GPS units 22. Each train portable GPS unit 22 may communicate with one or more yard systems and provides protection for the train locomotive operators while operating in the rail yard, and further provides sufficient GPS data to determine the locomotive's position and the track location. (It should be noted that one or more of the train portable GPS units 22 may not be available at the time the block 40 is operative in that the associated locomotive may be detached from the rail cars once the latter are positioned, and/or the portable GPS unit(s) 22 may be removed from the associated locomotive(s) inasmuch as the locomotive operator(s) may no longer be present in the associated locomotive(s) once the cars are positioned.) This rail car position information can be used to identify which rail cars associated with a particular train are in a location when each GPS unit 14 determines exact train profiles. This information can be correlated by a block 52 discussed hereinafter with the profile position from GPS unit 14 and sensors 12a, 12b, . . . , 12N to confirm the train configuration matches the manifest consist for the specific train of cars.

It may further be noted that the GPS coordinates of selected locations of the terminal (including rail tracks) may optionally be mapped and known in advance so that the outputs of the GPS units may be compared to such mapping to permit determination of crane and train positions in the rail yard. A block 42 then determines whether any of the laser sensors 12a, 12b, . . . , 12N is developing an output indicative of the presence of a train under such laser sensors. If one or more of the laser sensors 12 is detecting a train portion, a block 44 determines from the laser sensor 12 output(s) the distance to each train portion. A block 46 stores those distance(s) and the position of the crane 10 and train(s) 21 at the time of distance detection together with an associated time of sensor detection in the database 34 (FIG. 2) and/or, possibly, in other local or remote database(s). The data stored by block 46 are developed and stored in the database 34 and/or other databases as a sequence of data representing sensor readings over time and as a function of position for each train by correlating each laser reading with the associated time increment during which the laser reading was obtained, and further by correlating each laser reading with detected GPS positions of the crane 14 and train 21 relative to local coordinates. Alternatively, or in addition, the distance, position, and/or time data may be transmitted to another rail yard system.

Following the block 46, an optional block 49 senses the outputs of the optional device(s) 26 and stores an indication of car/container identification in the in the database 34, and/or transmits such indication to another rail yard system. Control then returns to the block 40 and control remains with the blocks 40-49 to detect and store other sensor readings until the block 42 determines that at least one of the train(s) that was being detected is no longer being detected (referred to as an "end of train event" for an associated train 21 hereinafter), whereupon control passes to a block 50. The block 50 determines whether the system 20 has been programmed in advance to develop a train profile of a train 21 each time an end-of-train event for a single train 21 is detected or whether the system is to wait until an end of train event has been detected for all trains 21. In the former case control passes to a block 52 whereas in the latter case control returns to the blocks 40-49 whereupon further sensor readings are obtained and stored as noted above until all end of train events have been detected for all trains 21.

The block 52 develops a profile indication for each train 21 from the data stored by the block 46 in the database 34. A block 53 derives one or more reports of the profile indication(s) in a desired format from the profile indication(s) developed by the block 52 and provides such report(s) to a block 54 and/or transmits the report(s) to any other recipient, block 56. The block 54 compares the manifest consist data stored in the database 34 to the data of the report(s) developed by the block 53 for any purpose, such as to determine whether each train 21 has arrived at the terminal with an expected train make up.

FIG. 3A represents the programming of the block 52 in greater detail. A block 59 filters the data to remove or otherwise modulate or modify data representing surfaces that have been painted, damaged, rusted, covered by snow or rain, or taped over to eliminate, or at least minimize, the effect of reflective surfaces, scratches, paints, or tape on containers with colors or reflectivity values that have overloaded the laser and caused erroneous laser readings during detection. A block 60 compares the filtered profile data for the train 21 against pre-stored data in a profile database (which may comprise the database 34 or which may be stored in another database/location) representing one or more car couplers to recognize which portions of the data represent the profiles of car couplers. A block 62 segments remaining portions of the data into multiple data sets that represent the cars of the train 21 (which, of course, are disposed between car couplers, except in the case of the last car of the train 21). Each data set representing a train car is compared by a block 64 against a number of pre-stored data sets in the profile database that represent known car profiles with or without loads (such as a box car, a tank car, a locomotive, a caboose, an empty container car, a container car variously loaded with one or more containers including a single container, stacked containers, containers of varying length, etc.) so that the cars can be recognized and profile data can be converted into data by a block 66 representing the make-up (or consist) of the train 21. The stored indications in the profile database may be profiles supplied, for example, by railroad(s) identifying, among other things, train loading expected to be received in the terminal serviced by the crane 10. The data developed by the block 52 may be combined with detections of indicia on the containers/cars supplied by the optional device(s) 26. The profile(s), comparison result(s), identification(s) of particular container(s)/car(s) by the optional component(s) 26 (if any), the positions of the train(s) 21, and any other data are used by the device 24 and/or displayed to an operator and/or supplied to any other device or terminal system. An operator may cause actions to be taken with respect to the train(s) 21 and/or car(s)/container(s), as necessary or desirable. Thus, the device 24 or the terminal can identify discrepancies in train departure and arrival loading, identify containers that are to be offloaded or loaded onto a train, identify cars that are to be removed or added to a train, and the like.

Referring again to FIG. 1, the system 20 can discern between non-container and container rail cars. Each laser sensor when combined with the position accuracy of the GPS system 14 can also discern between stacked or non-stacked multiple containers 23b-1 and 23b-2 disposed in a well of a container car, an empty car 21a-1, and one high or two high containers in cars, 21a-2, and 21a-3. The system 20 can also determine the container size, such as a 20 or a 40 foot container, a 45 foot container, etc. or combinations thereof.

FIG. 4 illustrates an alternative embodiment that develops profile(s) "on the fly," i.e., when the crane is accumulating distance and position information. Programming blocks common to FIGS. 3 and 4 have identical reference numerals. A portion of the flowchart of FIG. 4 is identical to that shown in FIG. 3 in that blocks 38-44 are operable to obtain sensor data from the laser sensors 12. Following the block 44, a block 70 initiates and augments profile data development with respect to each of a plurality of train elements wherein each train element includes car couplers and rail cars. Thus, for example, when a train element (such as a car coupler, a locomotive, a box car, a tank car, a container car, a caboose, etc.) is initially detected, a record is established in a database, such as the database 34, relating to the train element. Thereafter, as further sensor readings are obtained with respect to the train element, the block 70 stores further sensed data in the record of the database, and such augmentation continues until a block 72 determines that an end of the train element has been reached, whereupon control passes to a block 74. The block 74, like the block 52 described above in connection with FIGS. 3 and 3A, processes the profile data for the train element and compares the data against pre-stored data in the database 34 or elsewhere representing known train elements to identify the train element. Thereafter, a block 76 initiates and augments development of consist data representing the cars and couplers of the detected train 21 and stores such data, for example, in the database 34. The beginning and/or end of each train element may be indicated and/or sensed in various ways, such as by sensing one or more markings disposed at one or both of head end and rear end portions of the train elements, by recognizing differences between couplers and cars so that the data can be segmented on the fly, by analyzing the output(s) of the optional device(s) 26 as detected and stored by the block 49, or a combination of such approaches.

When the block 42 determines that no portion of at least one train is being detected, a block 78, like the block 50, determines whether the system 20 has been programmed in advance to develop a train profile of a train 21 each time an end-of-train event for a single train 21 is detected or whether the system is to wait until an end of train event has been detected for all trains 21. In the former case control passes to the block 53 whereas in the latter case control returns to the blocks 40-49 and 72-76 whereupon further sensor readings are obtained and stored as noted above until all end of train events have been detected for all trains 21.

As should be evident from the foregoing, the profile(s) data for the train(s) 21 are already available in the database 34 for use by the blocks 53 and 54 so that report(s) may be generated and sent by the block 56 to the terminal or other operator.

The GPS position is extremely accurate and provides the basic longitudinal reference for the laser sensor readings to construct a train profile. The train profile enables the terminal to verify that the expected rail cars and loads comply with the train in the yard. Further, the profile with the rail car and load positions enables the rail yard to organize the unloading or loading of the train, know all locations with various size containers and positions, and perform operations in a semi- or fully automatic manner.

The inclusion of one or more barcode, OCR, and/or RFID readers 26 enables all loads (e.g., containers) be identified with precise positions. This information can be used to interface with the TOS 23 for load and/or car movement optimization. For instance, the rail car AEI (automatic equipment identification) tags and readers located on both sides of the track entrances and exits can be used to determine which track the train is on and if the cars that are detected agree with the manifest consist. It can be determined which cars enter on the track, are removed from the track, and remain on the track. This information can be used along with the database and readings to confirm car and container location.

INDUSTRIAL APPLICABILITY

In general, the profile detection system 20 is capable of determining the physical configuration of one or more trains each consisting of containers, trailers, and/or bulk product. The physical configuration includes the length and height of the train contents, thereby enabling the train configuration to be quantified, checked against the train manifest, and controlled with car and container movements. The physical configuration is determined by using a combination of sensors including GPS and laser sensors. The sensors provide time correlated location and position information that are used to determine, for example, the size and quantities of containers on a railroad car, the size of a trailer located on a railroad car, or empty or filled rail cars. The physical description is compared to the characteristics of rail car couplers and rail cars to determine the presence of, for example, an empty container slot, or the presence of one or two high stacks of containers, or another loaded or unloaded rail car. This information can be used to verify the train consist data or identify train configuration anomalies, as well as enabling car splitting or container movement and redistribution.

The system 20 can work on any number of tracks based on the appropriate distribution of lasers on the crane and an accurate yard and track layout. The crane GPS determines the latitude and longitude of the laser sensors enabling track correlation. The laser sensors provide the height along the track and are time correlated with the GPS location data to determine railcar location and content. In fact, the system could also be used on a cantilever type crane to detect the presence of one or more containers stored at trackside storage locations so that such containers can be handled in an efficient manner.

The profile detection system yields accurate results with relative movement between the crane and train of five miles per hour or greater. The GPS system is a differential GPS system enabling accuracies of two centimeters or less and the laser system has an accuracy of less than three millimeters and a preferable frequency response of up to fifty hertz. Higher frequency responses enable higher accuracy and greater relative speed between the crane and the train during sensing. GPS receivers are located in the base station, on the crane, and at the front or back of the train.

Additional benefits can be obtained by strategically locating OCR cameras, RFID readers, or bar code readers to enable container identification to be gathered and utilized with the container physical configuration. The outputs of such device(s) may be sensed at one or more other execution points in the programming of FIGS. 3 and 4.

It should be noted that the profile detection system 20 is usable in non-rail applications. In one example, the profiling system 20 determines the height of plate or bar stock in a steel mill or a steel distribution facility. This provides an inventory feedback mechanism on a constant basis to verify stock status or variations to expected inventory. GPS is used to map the inventory locations and the output(s) thereof may be combined with the laser sensor output(s) to enable a moving crane to undertake a dynamic measurement of the current inventory status, including an indication of at least one, and preferably, all of inventory presence, inventory height, and inventory length thereby allowing an automated alert to be developed and sent to the facility about the potential need for an inventory reconciliation. This same approach can be adapted to a concrete facility, lumber facility, or any other facility where a profiled height and/or length at locations where product is present can be accurately used for an indication of inventory status.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. A profile detection method, comprising the steps of:
providing a Global Positioning System unit and a laser sensor to be disposed adjacent an article wherein the Global Positioning System unit, the laser sensor, and the article are relatively movable;
using the laser sensor to detect distances from the laser sensor to reflective surfaces of the article as the laser sensor is moved;
sensing outputs of the Global Positioning System unit and the laser sensor;
sensing by a further sensor an article identification tag and developing an indication of article location based on sensing the article identification tag; and
developing, with an indication device, an indication of a profile of the article responsive to the sensed outputs of the Global Positioning System unit and the laser sensor.

2. The profile detection method of claim 1, further comprising the step of providing the laser sensor on a support structure.

3. The profile detection method of claim 2, wherein the further sensor comprises one of: a barcode reader, an optical character recognition reader, a radio frequency identification reader, and an encoder.

4. The profile detection method of claim 3, including the further steps of disposing the Global Positioning System unit and the laser sensor adjacent a train component and developing an indication of a profile of the train component.

5. The profile detection method of claim 4, including the further step of providing an additional Global Positioning System unit disposed on the train component.

6. The profile detection method of claim 5, including the further step of disposing the Global Positioning System unit and the laser sensor on a crane.

7. The profile detection method of claim 6, wherein the indication device is further responsive to mapping data relative to a facility in which the indication device is disposed and develops an indication of at least one of: inventory presence, inventory height, and inventory length.

* * * * *